(12) United States Patent
Walker, Jr.

(10) Patent No.: US 6,475,255 B1
(45) Date of Patent: Nov. 5, 2002

(54) SERVICEABLE AIR FILTER/OIL SEPARATOR ASSEMBLY

(76) Inventor: Robert A. Walker, Jr., 26954 White Horse Pl., Santa Clara, CA (US) 91351

( * ) Notice: Subject to any disclaimer, the term of this patent is extended or adjusted under 35 U.S.C. 154(b) by 0 days.

(21) Appl. No.: 09/707,827

(22) Filed: Nov. 7, 2000

(51) Int. Cl.[7] .......................... B01D 45/08; B01D 50/00
(52) U.S. Cl. .......................... 55/315; 55/320; 55/385.3; 55/441; 55/482; 55/503; 55/504; 55/DIG. 19; 96/189; 123/198 E
(58) Field of Search .......................... 55/315, 318, 320, 55/385.3, 441, 446, 482, 503, 504, DIG. 619; 96/188, 189, 190, 191; 123/198 E

(56) References Cited

U.S. PATENT DOCUMENTS

| | | | |
|---|---|---|---|
| 2,385,814 A | | 10/1945 | Kamrath |
| 3,277,876 A | | 10/1966 | Abts |
| 3,614,859 A | | 10/1971 | Clark |
| 3,721,069 A | | 3/1973 | Walker |
| 3,789,582 A | | 2/1974 | Graybill |
| 4,184,858 A | | 1/1980 | Walker |
| 4,653,457 A | | 3/1987 | Stege |
| 4,724,807 A | | 2/1988 | Walker |
| 4,861,359 A | | 8/1989 | Tettman |
| 4,947,806 A | | 8/1990 | Speer et al. |
| 5,140,957 A | * | 8/1992 | Walker .................. 123/198 E |
| 5,347,973 A | | 9/1994 | Walker, Jr. |
| 5,479,907 A | | 1/1996 | Walker, Jr. |
| 6,009,846 A | | 1/2000 | Walker, Jr. |
| 6,187,073 B1 | * | 2/2001 | Gieseke et al. ......... 123/198 E |

OTHER PUBLICATIONS

Walker Engineering Company, Airsep, "Walker Breathing System for Diesel Engines," 2 pages.
Walker Engineering Company, Airsep, "Walker Engine Breathing System for Automotive Diesels," "Schematic Diagram of Engine Breathing System for Automotive Diesels," 2 pages.
Oil / Air Separation: New Economics for Engins? Airsep . . . and engines breathe again. GO, Apr. 1981, 3 pages.

* cited by examiner

Primary Examiner—Robert A. Hopkins
(74) Attorney, Agent, or Firm—Christie, Parker & Hale, LLP

(57) ABSTRACT

An air filter/oil separator assembly comprises a housing having an outer wall and a channel disposed therein between a primary gas inlet and a primary gas outlet. An air filter is joined to the primary gas inlet for filtering air from the immediate environment for introduction into an engine intake system. The housing includes a secondary inlet port through the outer wall, for receiving an air-oil mixture taken from an engine crankcase breather, and a secondary outlet port through the channel wall. A baffle is disposed axially within the housing and extends axially between the outer wall and the channel wall. The baffle, outer wall, and channel wall together define a first and second air flow passageway between the secondary inlet and secondary outlet ports. A removable filter element is disposed within at least one of the first and second passageways to capture air-borne particulate matter and/or aid in the coalescence and separation of oil within the air-oil mixture.

30 Claims, 5 Drawing Sheets

SERVICEABLE AIR FILTER/OIL SEPARATOR ASSEMBLY

FILED OF THE INVENTION

This invention relates to an air filer/oil separator assembly used with internal combustion engines to treat an air-oil mixture taken from an engine crankcase breather and, more particularly, to an air filter/oil separator assembly comprising one or more serviceable oil-coalescing filters.

BACKGROUND OF THE INVENTION

Air filter/oil separator devices used with internal combustion engines to treat air-oil mixtures taken from an engine crankcase are known in the art. Such devices take an air-oil mixture from the engine crankcase, using a vacuum produced by the intake system of the engine or turbocharger, and separate the oil component from the mixture by passing the air-oil mixture through the device. The separated oil is collected within the device and is routed back to the engine where it is recombined with the engine oil. The air component of the air-oil mixture is passed, via the device, into an intake system of the engine or turbocharger for subsequent combustion. Such devices are described in U.S. Pat. Nos. 5,140,957; 5,479,907; and 6,009,846, which are each incorporated herein by reference.

In order to efficiently remove the oil component from the entering engine crankcase air-oil mixture, such known air filter/oil separator devices typically comprise one or more baffles disposed within an airflow passageway of the device to both reduce the velocity of the air-oil mixture passing through the device, thereby increasing the residence time of the mixture within the device, increasing the thermal contact area between the entering air-oil mixture and the device and, thereby increasing the thermal conduction cooling of air-oil mixture as it is passed through the device. Both of these functions serve to promote the separation of oil from the air-oil mixture, thereby promoting efficient operation of the separator device.

Such separators are known to additionally make use of a permanent filter media within the airflow passageway for purposes of promoting oil coalescing and/or trapping air-borne particles within the device. The filter media can be in the form of one or more filter pads that are placed within internal airflow channels or passageways in the device. In all cases, the filter media is a permanent element within the device and is not serviceable. As a result, while use of the filter element can initially improve operational efficiency of the separator, by promoting oil separation, the service life of an air filter/oil separator device comprising such filter media is somewhat limited to the period of time during which the filter media remains functional. Once the filter media becomes saturated with oil and air-borne particles to the point that a desired pressure differential across the filter media can no longer be maintained, the entire air filter/oil separator device must be replaced.

Such nonserviceable separator devices, therefore, provide a degree of oil removal efficiency that is tempered or compromised by the need to provide a device having an acceptable service life. While one can increase the oil removal efficiency by simply using more baffles or a less restrictive filter media, the service life of the device would be reduced due to higher oil particle and air-borne particle trapping, ultimately causing the device to clog.

It is, therefore, desirable that an air filter/oil separator assembly be constructed in a manner that is both capable of providing an improved oil removal efficiency without compromising separator service life when compared to the conventional air filter/oil separator devices described above.

SUMMARY OF THE INVENTION

An air filter/oil separator assembly, as constructed according to principles of this invention, comprises a serviceable filter media that is positioned within an air-oil mixture flow passageway in the assembly housing. The serviceable filter provides improved oil separation and removal efficiency without adversely impacting separator service life.

A separator assembly of this invention, for filtering air flow and separating air-contaminate mixtures, comprises a housing having an outer wall and a channel disposed therein between a primary gas inlet and a primary gas outlet. An air filter is joined to the primary gas inlet for filtering air from the immediate environment for introduction into an engine intake system via the primary gas outlet.

The housing includes a secondary inlet port through the outer wall, for receiving an air-oil mixture taken from an engine crankcase breather, and a secondary outlet port through the channel wall, for delivering separated air for introduction into an engine intake system via the primary gas outlet. A baffle is disposed axially within the housing and extends between the outer wall and the channel wall. The baffle, outer wall, and channel wall together define first and second air flow passageways between the secondary inlet and secondary outlet ports.

A removable filter element is disposed within at least one of the first and second passageways to capture air-borne particulate matter and/or aid in the coalescence and separation of oil from the air-oil mixture. The assembly includes means for removably attaching the serviceable filter element within the housing and for providing a substantially air-tight seal with the housing.

Air filter/oil separator assemblies of this invention are capable of providing improved oil removal efficiency without adversely compromising separator service life, when compared to conventional air-filter/oil separators. Air filter/oil separator assemblies of this invention are known to provide an oil removal efficiency that is up to 20 percent greater than that provided by conventional air filter/oil separator devices that either have a permanent internal filter, or that lack an internal filter altogether.

BRIEF DESCRIPTION OF THE DRAWINGS

These and other features and advantages of the present invention will become appreciated as the same becomes better understood with reference to the specification, claims and drawings wherein:

DETAILED DESCRIPTION OF THE INVENTION

Air filter/oil separator assemblies of this invention comprise a serviceable filter media disposed therein between a secondary inlet port providing an engine crankcase air-oil mixture thereto, and a secondary outlet port providing filtered and separated air to an engine intake system. The serviceable filter media can be disposed in one or more assembly housing air flow cambers or passageways to separate oil and trap air-borne particles from the entering crankcase air-oil mixture, and is designed to be removable from the assembly to facilitate cleaning and/or replacing when the filter media reaches its capacity, thereby providing improved oil removal efficiency and extended separator assembly service life. The present invention is an improvement of the separator assemblies described in U.S. Pat. Nos. 5,140,957; 5,479,907; and 6,009,846, which are each incorporated herein by reference.

Figure 1:
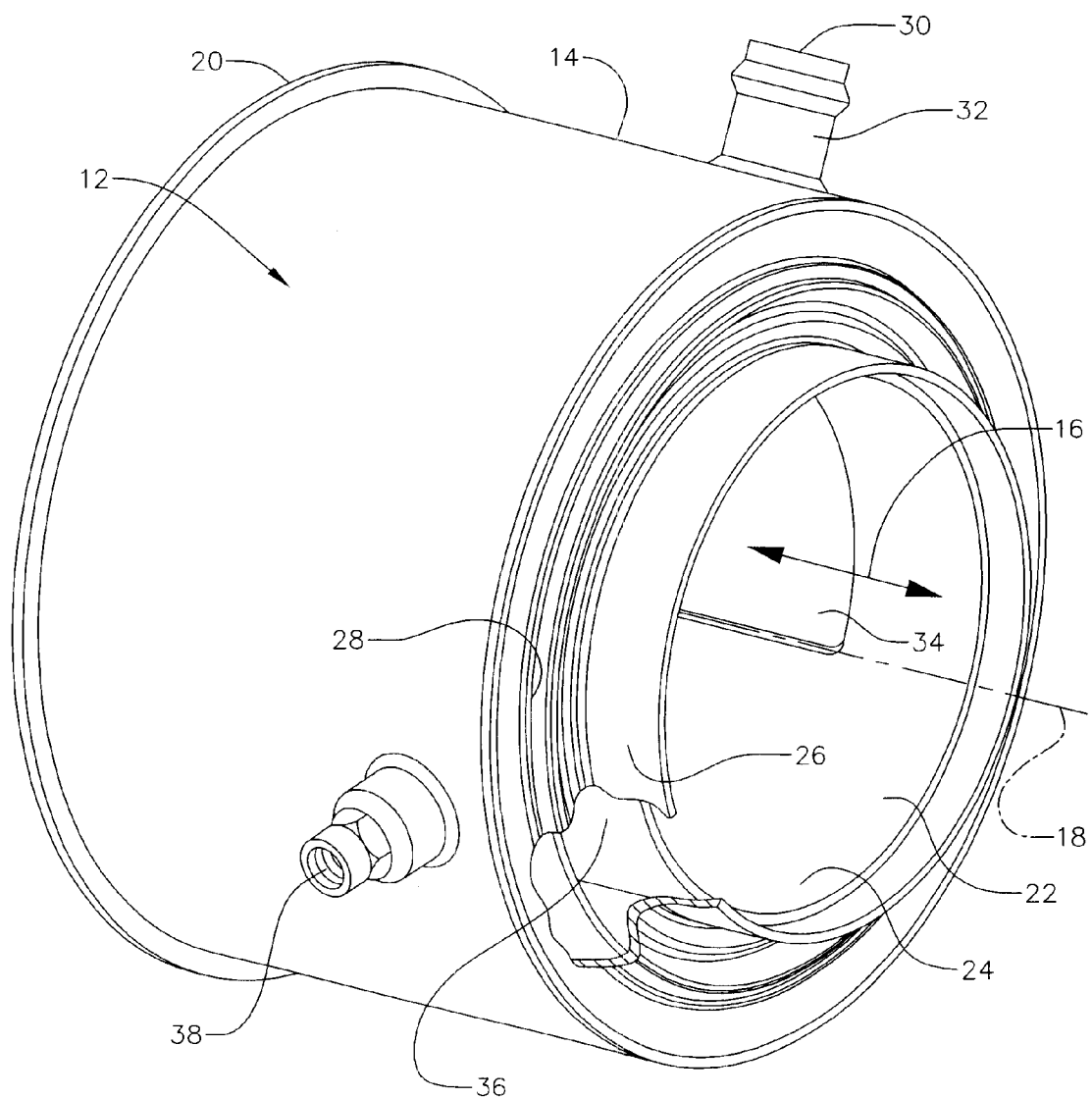
FIG. 1 is a schematic view of an air filter/oil separator assembly housing of this invention.

FIG. 1 illustrates an air filter/oil separator assembly housing 12 of this invention for receiving a crankcase air-oil mixture and separating contaminants (including oil and other heavy hydrocarbons, and air-borne particulate matter) therefrom before routing filtered and separated air into an engine or turbocharger air intake system. The housing 12 has a substantially annular shape including an outer wall 14 that can be formed from aluminum, sheet metal or other material suitable for providing a necessary level of structural rigidity, and for withstanding the temperature and environment associated with internal combustion engines.

A channel 16 forms the central portion of the annular housing 12 and defines an axis 18 about which the housing is substantially symmetrical. The channel 16 has a primary gas inlet 20 at one end of the annular housing. The primary gas inlet 20 is joined to an annular air filter, (shown in FIGS. 3 to 5) which is also substantially symmetrical about axis 18. The channel 16 also has, at an opposite end from the primary gas inlet 20, a primary gas outlet 22, typically coupled to an air induction system of an engine or turbocharger.

The channel 16 has a channel wall 24 preferably formed from the same material used to form the outer wall 14. The channel wall extends along axis 18 a distance greater than the length of the outer wall 14, forming an inlet flange (50 in FIG. 3) and an outlet flange 26 for coupling to respective hoses or ducts for conducting the primary air flow and for allowing continuous flow between the hoses or ducts and the channel 16. The inlet flange is substantially the same as outlet flange 26, but faces in the opposite direction relative to the outlet flange. Air flows through the channel 16 from the inlet flange to the outlet flange 33.

The housing outlet wall 14 and the channel wall 24 are maintained in a spaced-apart relation with respect to each other through an end surface 28, at one axial end of the housing, and a removable lid (shown in FIGS. 3 and 4), at an opposite axial end of the housing. The end surface 28 is riveted or otherwise fastened to the housing outer, channel wall, and at the outlet flange in a manner such as that described in U.S. Pat. No. 4,724,807 to form a air-tight, except as described below, hollow enclosure.

A secondary inlet port 30 extends through the outer wall 14 by means of tube 32 which is preferably riveted or spot welded to the outer wall. The secondary inlet port 30 provides a gas flow path for directing an air-oil mixture into the interior of the annular housing. The secondary inlet is adapted to be coupled to an air breather connection of an internal combustion engine as described more fully below and illustrated in FIG. 5. The annular housing 12 further comprises a secondary outlet port 34 opening in the channel wall 16.

An optional air-silencer (not shown) can be positioned within the channel wall 24 to reduce the noise of the air passing through the secondary outlet port 34 into the channel 16.

The secondary outlet port 34 is positioned within the housing so that there is no straight-line flow path between the secondary inlet and the secondary outlet ports. The interior of the housing defines one or more air flow passageways or chambers for air/fluid flow between the secondary inlet and the secondary outlet ports. The passageways are defined at an outer most extreme by the inside surface of the outer wall 14 and at an inner most extreme by the inside surface of the channel wall 24.

As will be discussed more fully below, a first baffle 36 is positioned in the housing between the outer wall and the channel wall and spaced apart from each. One axial edge of the first baffle is connected to the end surface 28, and an opposite axial end of the first baffle is adapted for connection with the removable lid. In a preferred embodiment, the axial edge of the first baffle is sealed against the end surface 28 with a silicone or epoxy sealer to prevent passage of the crankcase air between the baffle and end surface. The outer wall, the baffle, and the channel wall are preferably concentric with one another.

Referring still to FIG. 1, the separator assembly housing 12 includes a drain coupling 38 that is preferably centrally mounted between the axial edges of the outer wall 14 to allow oil to drain from the interior of the annular housing. A hose or other similar conduit may be attached to the coupling for feeding the oil to an engine block.

Figure 5:
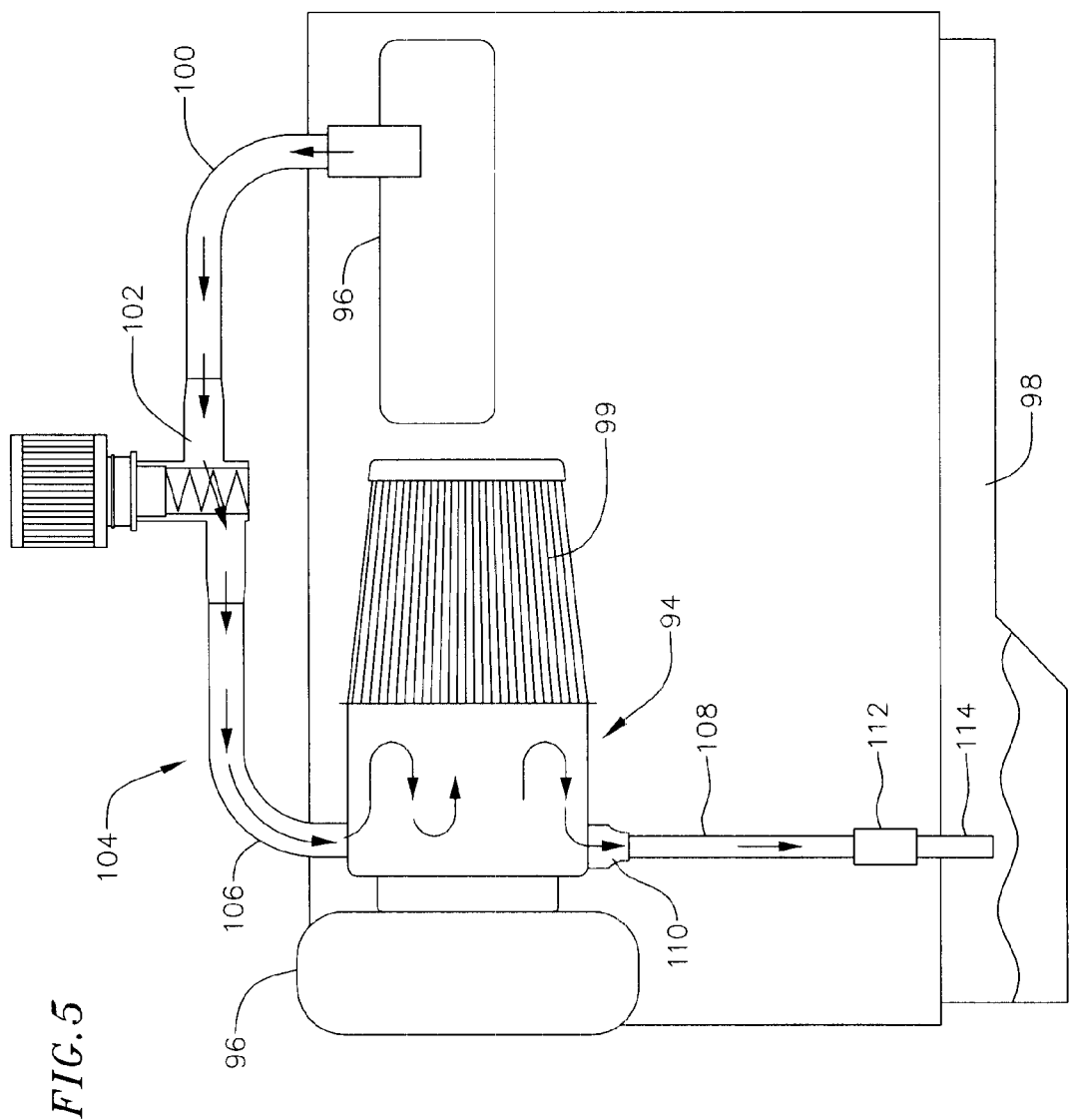
FIG. 5 is a schematic view of the air filter/oil separator assembly of FIG. 4 as used in conjunction with an internal combustion engine.

A check valve (as shown in FIG. 5) is preferably coupled in a conventional manner between the hose and the engine block, to prevent back flow of oil from the crankcase to the interior of the annular housing. The valve is necessary because the vacuum level in the crankcase may be higher than vacuum level in the housing. The circumferential location of the drain coupling with respect to the secondary inlet 30 will be determined by the final orientation of the housing with respect to the engine. Once the final orientation is determined, the drain coupling is mounted to the outer wall at the bottom of the housing so that the oil enters the coupling through force of gravity. However, for any given engine design, the position of the coupling will be the same.

Figure 2:
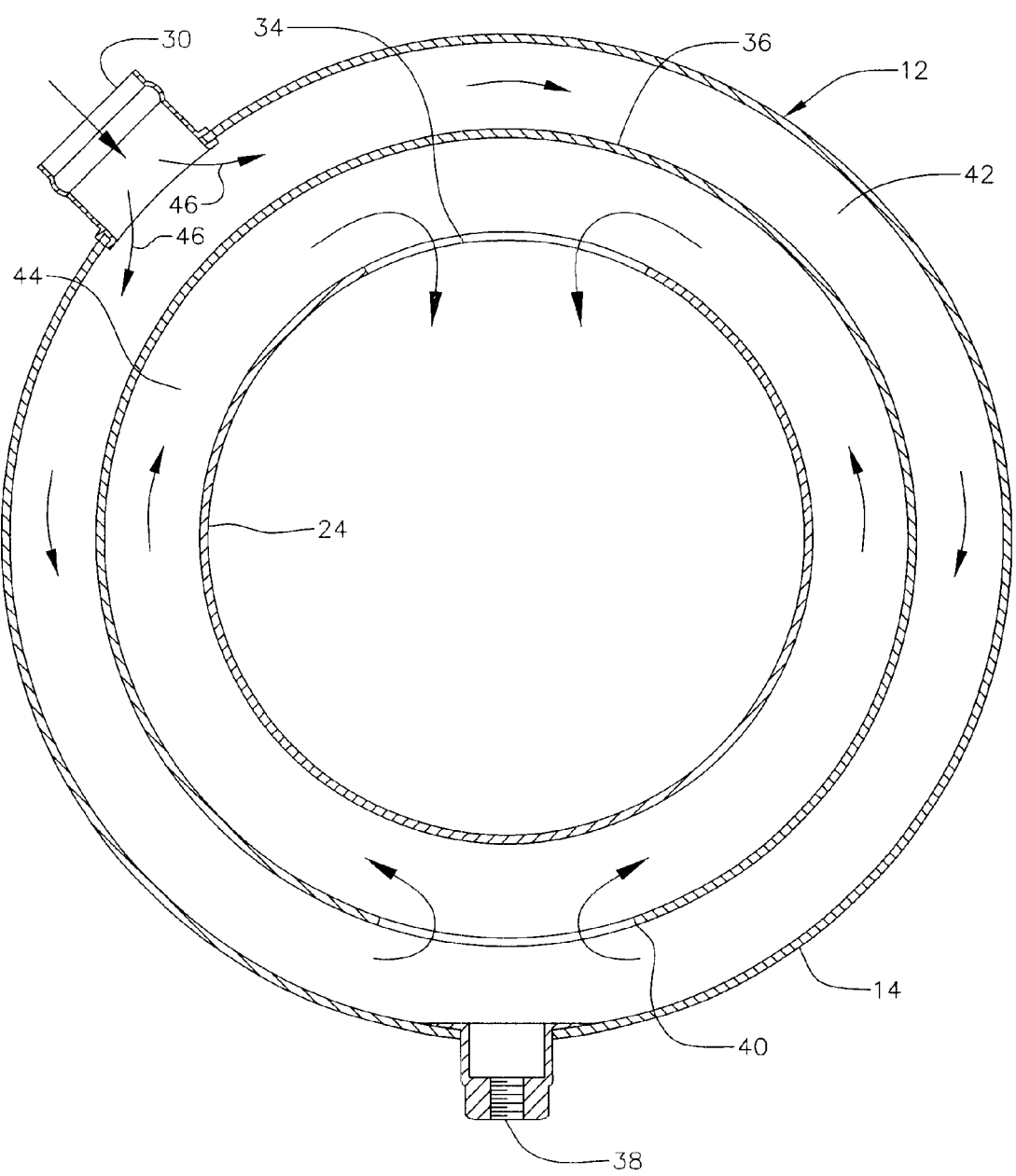
FIG. 2 is a vertical cross-sectional schematic view of the housing of FIG. 1.

Referring to FIG. 2, the secondary inlet 30 is oriented near the physical top of the assembly housing 12. The drain 38 is located at the bottom of the housing. The baffle 36 is concentric with and is interposed between the housing wall 14 and the channel wall 24. The baffle 36 includes an opening 40 located on a side of the housing substantially opposite that of the secondary inlet 30 and the secondary outlet 34.

As can be seen, the baffle 36 defines two concentric air flow passageways within the housing along which the entering air-oil contaminant mixture must pass before reaching the secondary outlet port 34 and being passed into an engine intake system. In a preferred embodiment, the housing comprises two concentric air flow passageways or chambers; namely, a first or "outer" passageway 42 residing within the annular space between the baffle 36 and the housing wall 14, and a second or "inner" passageway 44 residing within the annular space between the baffle 36 and the channel wall 24. Air flow within the housing between the secondary inlet port 30 and the secondary outlet port 34 is indicated by the arrows 46.

In a preferred embodiment, the secondary inlet 30 has a diameter of approximately 1-¼ inches. The secondary outlet port 34 is in the shape of a rectangle with slightly rounded corners, and has an arcuate opening distance of approximately 3.5 inches and an axial opening distance of approximately 3.5 inches. The inside diameter of the channel 16 is approximately 6 inches, the diameter of the baffle 36 is approximately 7 inches and the diameter of the outer wall 14 is approximately 8-½ inches. It is to be understood that the above-provided dimensions are exemplary for a particular embodiment and will vary depending on the separator assembly application.

If desired, the housing can be configured having one or more secondary baffles disposed within the first and/or second passageways. Such secondary baffles may be desired to control air flow velocity and/or oil condensation effect within the housing. Example passageways comprising such secondary baffles are described in U.S. Pat. Nos. 5,140,957; 5,479,907; and 6,009,846, which are each incorporated herein by reference.

Figure 3:
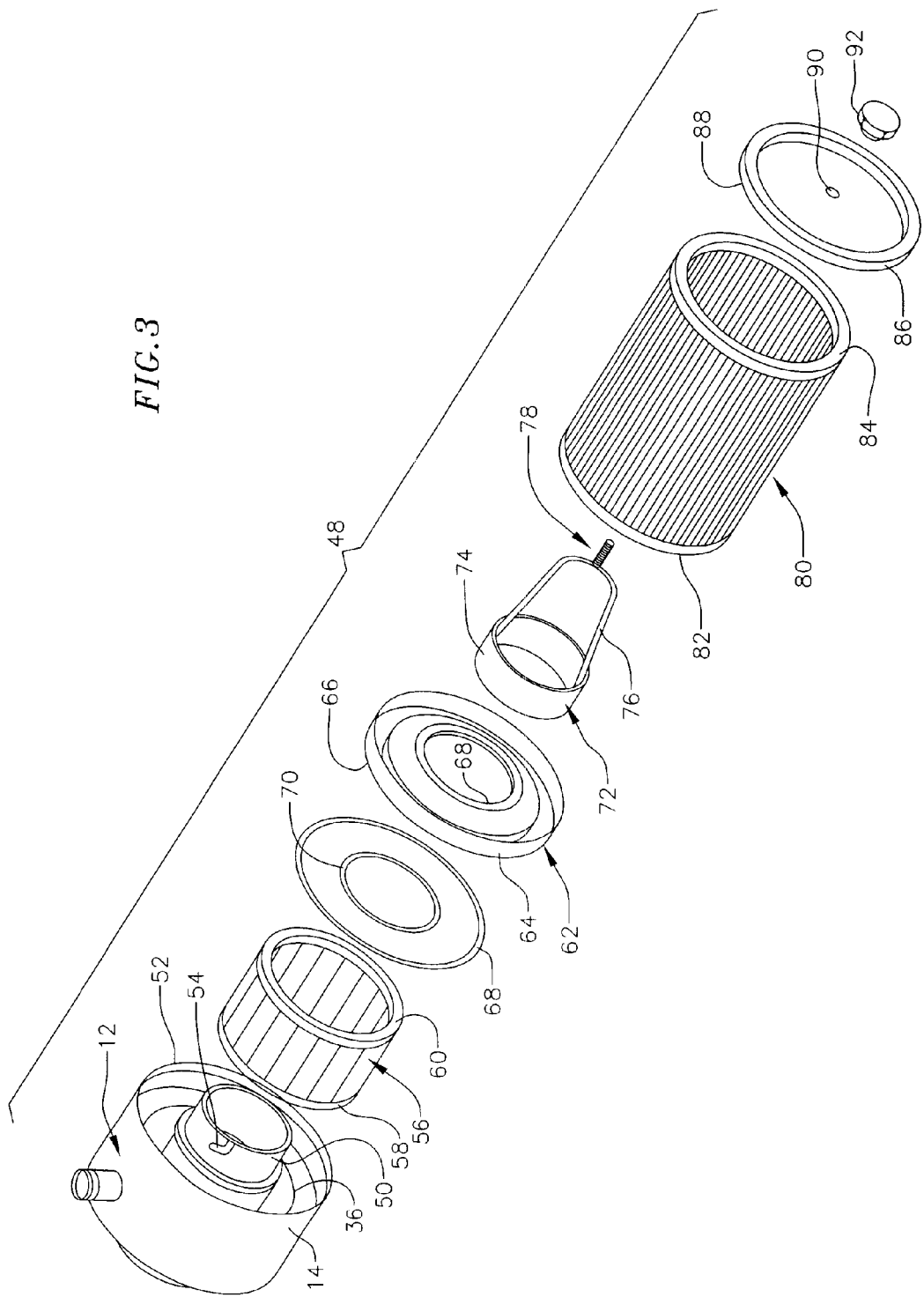
FIG. 3 is an exploded schematic view of the housing of FIG. 1 in combination with other elements making up an air filter/oil separator assembly of this invention.

FIG. 3 illustrates the assembly housing 12 of FIGS. 1 and 2 as combined with other elements to form the air filter /oil separator assembly 48 of this invention. The housing 12 comprises an inlet flange 50 as described above that is connected to and that projects axially outwardly from the channel wall 24. The baffle 36 is also seen as having an axial end that is recessed axially inwardly from an axial edge 52 of the housing outer wall 14. The inlet flange 50 includes a groove 54 disposed therein that is sized and shaped to cooperate with a complementary tongue in a filter retainer (described below) to provide a bayonet-type attachment mechanism for an air filter retainer.

A removable filter 56 is sized and configured to fit within one or both of the housing first and second passageways (42 and 44 shown in FIG. 2). In an example embodiment, the filter 56 is in the form of a continuous annular ring element or cartridge that is sized to fit within the second passageway 44. The filter element 56 can be formed from conventional types of materials useful for separating entrained oil from the air-oil mixture entering the assembly due to the enhanced collection sites provided by the material. The filter material may be selected from the group of materials that are chemically resistant to the effects of heavy hydrocarbons. A particularly preferred filter material is polyester fiber. The filter material and filter element can be constructed to permit reuse after proper cleaning, or can be constructed to provide one-time use.

The filter element 56 comprises axial ends 58 and 60 that are configured and/or formed from a suitable material that provides a substantially leak-tight seal against adjacent respective surfaces, i.e., the housing end surface and the lid. Thereby, minimizing or preventing diversion of the oil-air mixture around rather than through the filter media.

In addition to a filter element disposed in the second passageway, the assembly may comprise a filter disposed in the first passageway (not shown). Such filter could be in the form of a continuous filter element concentric around the second passageway, or could be in the form of a filter pad, i.e., a noncontinuous section of filter material positioned strategically within the first passageway. For example, the first passageway can include a filter pad (not shown) that is sized and configured to fit into the first passageway adjacent the secondary inlet port to trap oil and air particulate matter entering the housing before being passed to the second passageway for further treatment by the filter element disposed therein. In either case, a filter disposed within the first passageway would be removable for service or replacement.

A housing lid 62 is in the shape of an annular disk having a surface that is configured to mate against the open end of the assembly housing 12. The lid 62 has an outer edge 64 that is sized to fit within the projecting axial end 52 of the housing, and has a axial end surface 66 that is configured to abut against an axial end of the baffle 36. The lid 62 includes a central opening 68 that is sized to accommodate passage of the inlet flange 50 therethrough. The lid is preferably formed from the same type of material used to form the housing and is imperforate moving radially outwardly from the central opening to the outer edge.

Means are interposed between the open end of the housing 12 and the lid 62 to provide a substantially leak-tight or air-tight seal therebetween. Specifically, the lid functions to seal off the housing first and/or second passageways from both the outside environment and from one another. In an example embodiment, the sealing means is in the form of one or more O-ring seals. In a preferred embodiment, the means is in the form of two O-ring seals; namely, a first O-ring seal 68 having a diameter sized for placement between the lid axial end surface 66 and the housing, and a second O-ring seal 70 having a smaller diameter sized for placement between the lid central opening 68 and the housing inlet flange 50. Together, the first and second O-ring seals provide a substantially air-tight seal between the lid and the housing.

An air filter retainer 72 has a substantially ring-shaped body 74 that is sized to fit over the lid central opening 68 and around the housing inlet flange 50. The body 74 includes a tongue (not shown) that is sized and configured to mate with the groove 54 within the housing inlet flange 50 to provide a releasible interlocking fitting therewith. In is to be understood that other types of mechanical attachment means can be used to provide a releasible attachment between the filter retainer and the housing and are thus understood to be within the scope of this invention.

The retainer 72 further includes a hanger 76 that extends axially outwardly from the retainer body 74 and that is sized and configured to project within an air filter and provide an attachment point for a filter top or cover. In an example embodiment, the hanger 76 is in the form of a wire member having opposite ends attached to the retainer body at diametrically opposed positions. The hanger 76 further includes a threaded stud 78 that projects axially outwardly from the hanger at a position located between the hanger ends.

An annular air filter element or cartridge 80 is positioned over the filter retainer 72 and is formed from conventional materials useful for filtering fresh air before being directed into the housing primary air inlet. The filter element 80 is formed from materials capable of removing air-borne particulate matter from the air, e.g., paper, polymeric fiber, and combinations thereof. The filter element 80 includes axial ends 82 and 84 that are configured and/or formed from materials capable of forming a substantially air-tight seal between adjacent surfaces of the respective lid 62 and a filter top.

A filter top or cover 86 is in the form of a substantially disk-shaped element that includes an inside edge surface 88 that is configured to complement and fit against the filter element axial end 84. The filter top can be formed from any type of suitable structurally rigid material, such as that used to form the housing, and includes a central opening 90 that is sized to accommodate placement of the filter retainer threaded stud 78 therethrough.

Once the filter element 80 is placed over the filter retainer 72 and the filter element axial end 82 is positioned against an adjacent lid 62 surface, the filter top 86 is positioned over the filter element and the retainer stud is guided through the filter top central opening 90. A threaded nut 92 is placed over the exposed retainer threaded stud 78 and is threadably tightened thereon so that the filter element 80 is snugged between the lid and the filter top.

Figure 4:
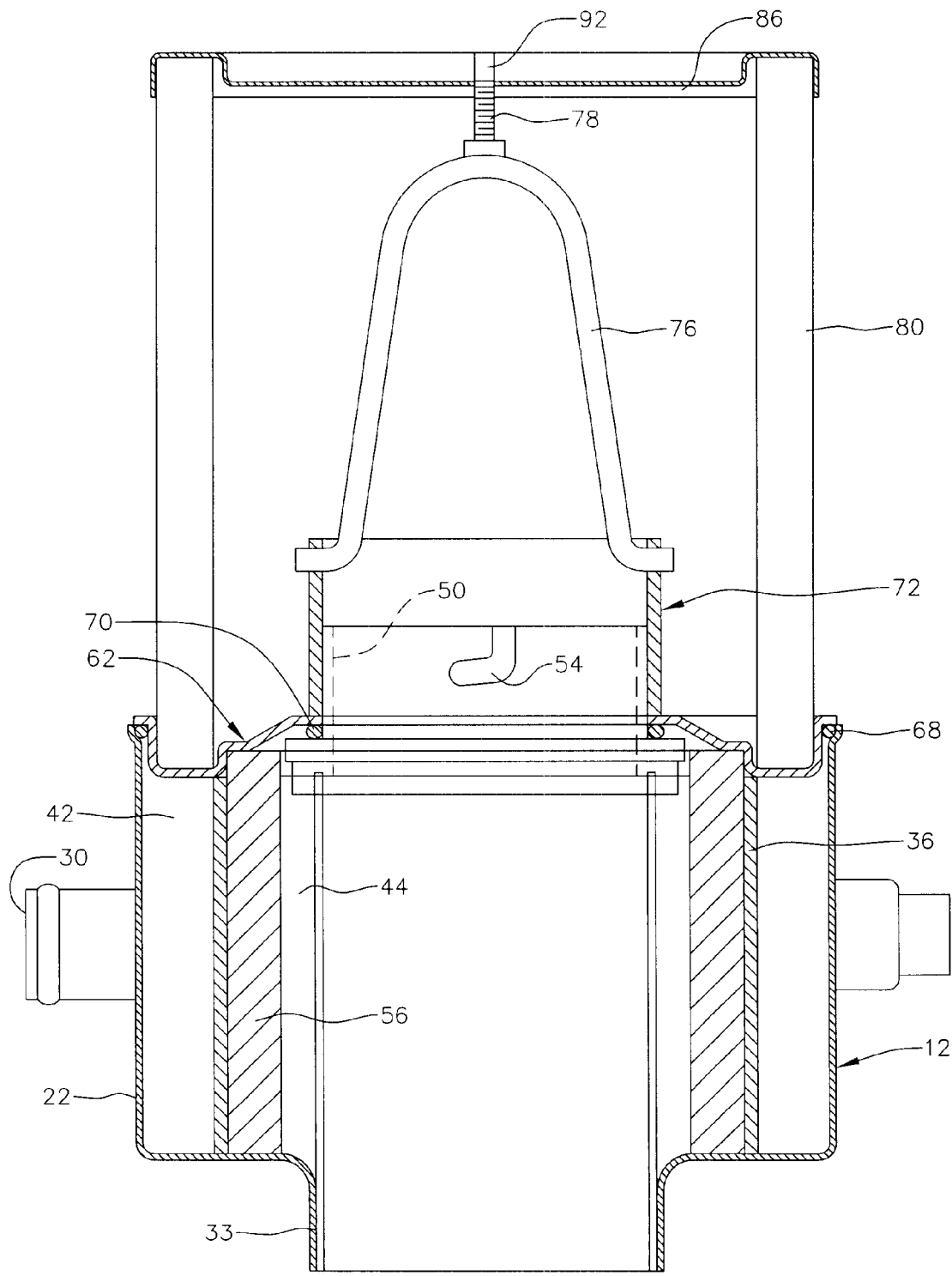
FIG. 4 is a horizontal cross-sectional schematic view of an air filter/oil separator assembly of this invention.

FIG. 4 illustrates the assembly elements of FIG. 3 in their assembled state, forming the air filter/oil separator assembly of this invention. The assembly housing 12 is shown to include the filter element 56 disposed within the second air flow passageway 44 with a filter outside diameter positioned adjacent the baffle 36. As mentioned above, if desired, a filter element can be positioned within the first passageway 42, e.g., in the form of a filter pad positioned within the first passageway 42 adjacent the secondary inlet port 30 to filter the air-oil mixture entering therefrom.

The removable lid 62 is shown positioned over the housing open end and the filter element 56, and the O-ring seals 68 and 70 are positioned between the lid and the housing to provide a substantially air-tight seal therebetween. The filter retainer 72 is disposed over the lid and is attached to the housing via interlocking cooperation between the inlet flange groove 54 and the complementary filter retainer tongue.

The air filter 80 is interposed between the lid 62, on one filter axial end, and the filter top 86, on the opposite filter axial end. The nut 92 is used to secure the filter top 86 to the filter retainer.

FIG. 5 illustrates placement of the air filter/oil separator assembly 94 of this invention as used with an internal combustion engine. Specifically, the separator assembly 94 can be attached either directly or indirectly to an engine comprising a crankcase valve cover 96 and an engine block oil pan 98. In an example embodiment, the separator assembly 94 is attached to an air intake system of the engine or, when used in a turbocharged application, is attached to a turbocharger 96 air intake system. Specifically, the primary gas outlet of the device is coupled to the engine intake air system, or a turbocharger air intake, through a hose or the like. Attached in this manner, the separator assembly functions to filter fresh air before it enters the engine or turbocharger via passage through the assembly air filter 99 and primary gas inlet and outlet.

A hose 100 extends from a breather port in the engine valve cover 96 and is connected at an opposite end to a vacuum limiter 102. A second hose 104 extends from the vacuum limiter 102 and is connected at an opposite end to the assembly secondary inlet port 106. The separator assembly is connected to the oil pan 98 by a first hose 108 that extends from the drain coupling 38 to a check valve 112, which is connected to the oil pan 98 via a second hose 114.

Referring now to FIGS. 2 and 5, the separator assembly functions to filter air and separate oil from an entering air-oil mixture in the following manner. Operation of the engine or turbocharger air intake system causes air to be pulled through the assembly air filter 99 and through the housing's central channel via the primary gas inlet and gas outlet. The air being passed through the housing's central channel is filtered via the air filter before being introduced into the engine or turbocharger intake system.

The passage of intake air through the housing's central channel creates a vacuum within the housing air flow passageways and a pressure differential between the housing's secondary inlet and outlet ports. This pressure differential is sufficient to cause a crankcase air-oil mixture within the valve cover 96 to be pulled through the hoses 100, 104 and the valve regulator 102 and into the secondary inlet port 106.

The pressure differential between the secondary inlet port 106 and the secondary outlet port is assisted by the difference in cross-sectional area of the valve cover breather port and the secondary outlet port. The ratio of the cross-sectional area of the air breather port to the cross-sectional area of the secondary outlet port may be about 12%, but may have a range of values depending on the type of engine, etc. The values may range from 8% to 25% but no outside limit for the range has been defined.

The valve regulator 102 functions to prohibit the possible carryover of oil from the crankcase valve cover 96 caused from an excessive vacuum being created within the assembly housing. This can happen, for example, if the air filter was to become plugged or obstructed during operation of the engine or turbocharger. Under such conditions, the vacuum regulator 102 shuts off passage of vacuum from the housing to the crankcase, thereby preventing potential oil carryover therefrom. A desirable vacuum regulator for use with the separator assembly of this invention is described in U.S. Pat. No. 5,347,973, which is herein incorporated by reference.

The contaminated air-oil mixture evacuated from the engine valve cover is introduced into the housing first air flow passageway 42 so that the air-oil mixture strikes the baffle 36. As described above, a serviceable filter can be placed within the first air flow passageway adjacent the secondary inlet port 106 to prefilter air-borne particulate matter from the entering mixture before it is passed further through the housing to the second air flow passageway.

The air-oil mixture passes through the first and second passageways 42 and 44 in the annular housing 12 along the flow lines indicated by the arrows 46 (FIG. 2). Oil in the contaminated air impacts and condenses by thermal conduction on the interior surfaces of the outer wall, the baffle, and the channel wall, and accumulates by gravity along a bottom portion of the housing adjacent the drain coupling 110.

Additionally, the air-oil mixture passed into the second passageway 44 comes into contact with an outside diameter surface of the filter element 56 (FIG. 4). As the air-oil mixture comes into contact with and is passed into the filter element, the oil component is coalesced for separation and removal. The remaining air component passed through the filter element is routed to the secondary outlet port 34 and directed into the channel 16 for routing to an engine intake system.

The serviceable filter element improves the oil separation or recovery efficiency of the separator assembly. In fact, air filter/oil separator assemblies of this invention, comprising a serviceable filter disposed within the housing air flow passageway, are known to provide oil removal efficiencies up to 20 percent greater than that provided by conventional nonserviceable designs.

Separated oil from the entering air-oil mixture is collected by gravity along the bottom of the first air flow passageway and is routed out of the housing via drain coupling 110, first and second hoses 108, 114, and the check valve 112. The check valve 112 operates to prevent the undesired flow of oil from the engine oil pan into the housing in circumstances when the vacuum created within the housing is greater than desired.

Separated and filtered air passing through the second air flow passageway exits the secondary outlet port, enters the channel, and merges with the just-filtered intake air. The merged air then continues along the channel to the engine or turbocharger air intake system for forming an air-fuel mixture and eventual combustion.

Attachment of the separator assembly to an engine creates a slight vacuum in the crankcase. The presence of oil droplets or particles in the crankcase atmosphere is due partly to the relatively high pressure in the crankcase. By attaching the separator assembly to an engine, the pressure in the crankcase is eliminated and an actual slight vacuum replaces the high pressure crankcase atmosphere. This serves to significantly decrease the amount of oil, contaminants and blowby byproducts entrained in the crankcase air, and may reduce oil consumption by up to as much as 50 percent.

The in-line arrangement of the separator assembly provides for a pressure differential between the breather and the channel for transferring the contaminated air from the breather. The design requires little modification of the air intake design of current engines and is simple and economical to assemble. Significantly, the in-line design with the filtered air being supplied to the induction system and the oil being returned to the oil system produces a closed crankcase ventilation system. The system conserves oil, returns lighter unburned hydrocarbons to the induction system, creates a slight crankcase vacuum, increases fuel efficiency and prolongs engine lifetime. Operation in this manner provides a closed crankcase ventilation system which complies with current requirements of the Clean Air Act.

A key feature of the separator assembly of this invention is the design of serviceable filter element disposed within one or all of the housing air flow passageways that can be easily removed for service and/or replacement. Use of a serviceable filter within the housing allows the separator assembly to provide a higher degree of oil removal efficiency than otherwise possible with conventional separator devices, that either lack an internal filter altogether or that make use of a permanent, nonserviceable internal filter, without adversely impacting the service life of the assembly. This is so because the serviceable filter can be designed to provide a higher degree of filtering and/or coalescing performance than otherwise practical for nonserviceable applications without having to worry about adversely impacting assembly service life, as the separator assembly service life is no longer defined by filter exhaustion. Rather, once the filter has become plugged or exhausted, it is simply removed and serviced or replaced.

Air filter/oil separator assemblies of this invention are, therefore, capable of providing an improved oil removal efficiency without adversely compromising assembly service life. In fact, air filter/oil separator assemblies of this invention are known to provide an oil removal efficiency that is up to 20 percent greater than provided by conventional separator assemblies that either lack an internal filter altogether or that make use of a permanent, nonserviceable internal filter.

It is to be understood that, within the scope of the appended claims, air filter/oil separator assemblies constructed according to principles of this invention may be embodied other than as specifically described herein.

What is claimed is:

1. An assembly for filtering air flow and separating air-oil contaminate mixtures, the assembly comprising:
   a housing having an outer wall and channel disposed therein between a primary gas inlet and a primary gas outlet;
   an air filter joined to the primary gas inlet;
   a secondary inlet port through the outer wall;
   a secondary outlet port through the channel wall;
   an air flow passageway between the outer wall and channel and interposed between the secondary inlet and secondary outlet ports such that there is no straight line air flow therebetween;
   a removable filter element disposed within the air flow passageway; and
   means for removably attaching the removable filter within the housing and for providing a substantially air-tight seal with the housing.

2. The assembly as recited in claim 1 wherein the means for removably attaching comprises:
   a housing lid having a central opening that is positioned over the removable filter element and the primary gas inlet, the lid extending radially from the central opening to a terminal edge that is positioned adjacent the housing outer wall;
   an air filter retainer disposed over the lid and connected to the housing primary gas inlet; and
   a cover disposed over the air filter and removably connected to the filter retainer, wherein the air filter is interposed between the lid and the cover.

3. The assembly as recited in claim 2 wherein the housing includes an inlet flange proximate the primary gas inlet, and wherein the filter retainer is releasibly attached to the inlet flange.

4. The assembly as recited in claim 1 wherein the air flow passageway is annular, and wherein the removable filter element is annular.

5. The assembly as recited in claim 1 further comprising a baffle interposed axially between the outer wall and the channel, wherein the baffle defines a second air flow passageway, and wherein the assembly comprises two removable filter elements each disposed within a respective air flow passageway.

6. The assembly as recited in claim 5 wherein the air flow passageways are arranged within the housing such that there is no straight air flow path between the secondary inlet and secondary outlet ports.

7. The assembly as recited in claim 1 wherein the means for removably attaching is an annular lid that is disposed along one of its surfaces onto an axial end of the housing proximate the primary gas inlet, the lid extending radially between the housing outer wall and the primary gas inlet.

8. The assembly as recited in claim 7 further comprising at least one O-ring seal interposed between the lid and the housing to provide a substantially air-tight seal therebetween.

9. The assembly as recited in claim 7 further comprising an air filter cover attached to the housing, wherein the air filter is interposed between the cover and the lid.

10. The assembly as recited in claim 9 further comprising an air filter retainer interposed between the lid and the air filter cover and connected at opposite ends to the lid and the air filter cover.

11. An air filter/oil separator assembly comprising:
   an annular housing comprising:
      an outer wall;
      a channel in the housing defining a central axis, having on one end of the channel a primary gas inlet and having on the opposite end of the channel a primary gas outlet, having a channel wall with inside and outside surfaces, and having an axial end surface that extends radially between the outer wall an the channel wall and that forms a closed housing end, the housing having an open end at its opposite axial end;
      a secondary inlet port through the outer wall;
      a secondary outlet port through the channel wall;
      at least one air flow passageway configured between the secondary inlet port and the secondary outlet port such that there is no straight line air flow therebetween;
   a filter element removably disposed within the passageway;

a lid removably disposed over the housing open end, the lid having a central opening positioned adjacent the primary gas inlet and extending radially between the channel wall and outer wall, the removable filter element being interposed between the lid and the housing;

an air filter disposed outside of the housing and over the lid; and means for removably securing the air filter to the housing.

12. The assembly as recited in claim 11 wherein the housing comprises a baffle positioned between the housing outer wall and channel wall and extending axially between the lid and housing axial end surface, the baffle defining first and second air flow passageways through the housing, the first air flow passageway being defined between the outer wall and baffle, and the second air flow passageway being defined between the baffle and the inner wall.

13. The assembly as recited in claim 12 wherein the filter element is disposed within the second air flow passageway and is a continuous annular ring.

14. The assembly as recited in claim 12 wherein the first and second air flow passageways each include a respective filter element.

15. The assembly as recited in claim 11 wherein the means for removably securing comprises a filter retainer and cover, wherein the filter retainer is attached at one end to the housing and at another end to the cover, and wherein the air filter is interposed between the cover and the lid.

16. The assembly as recited in claim 15 wherein the filter retainer is disposed within the air filter and extends axially along the filter to the cover.

17. The assembly as recited in claim 11 further comprising at least one O-ring seal interposed between the lid and the housing to provide a substantially air-tight seal therebetween.

18. An assembly for filtering air flow and separating air-contaminate mixtures, the assembly comprising:

an air filter joined to an annular housing having an outer wall;

a channel in the housing defining a central axis, having on one end of the channel a primary gas inlet coupled to the air filter, having on the opposite end of the channel a primary gas outlet adapted to be coupled to an engine induction system, and including a channel wall having inside and outside surfaces;

a secondary inlet port through the outer wall;

a secondary outlet port defining an opening in the channel wall such that there is no straight line flow path between the secondary inlet and the secondary outlet;

a baffle extending axially in the housing between the outer wall and the channel wall;

a first air flow passageway between the secondary inlet port and the secondary outlet port defined exteriorly by the outer wall and interiorly by the baffle;

a second air flow passageway between the secondary inlet port and the secondary outlet port defined exteriorly by the baffle and interiorly by the channel wall;

a filter element removably disposed within one of the first or second air flow passageways; and means for accessing the filter element and retaining the filter element within the housing.

19. The assembly as recited in claim 18 wherein the housing includes an annular end surface at a housing axial end that extends radially between the outer wall and channel wall, and that forms a closed housing end, the housing having an open opposite axial end.

20. The assembly as recited in claim 19 wherein the means for accessing is an annular lid that is removably positioned over the housing open axial end and that extends radially between the outer wall and the channel wall.

21. The assembly as recited in claim 20 further comprising an air filter retainer positioned over the lid and removably attached to the housing adjacent the primary gas inlet at one retainer end, and an air filter cover removably attached to an opposite retainer end, wherein the air filter is interposed between the lid and the cover.

22. The assembly as recited in claim 18 wherein the filter element is disposed within the second air flow passageway.

23. The assembly as recited in claim 22 wherein the filter element is a continuous annular member.

24. The assembly as recited in claim 18 wherein the first and second air flow passageways each include a filter element that is removably disposed therein.

25. The assembly as recited in claim 18 further comprising at least one O-ring seal interposed between the lid and the housing to provide a substantially air-tight seal therebetween.

26. An assembly for filtering air flow and separating air-contaminant mixtures, the assembly comprising:

an annular housing with an outer wall and a secondary inlet port extending through the outer wall;

a channel in the housing defining a central axis and having a primary gas inlet on one end, and a primary gas outlet on an opposite end;

a channel wall in the housing with inside and outside surfaces and a secondary outlet port defining an opening in the channel wall such that there is no straight line flow path between the secondary inlet and the secondary outlet;

an annular end surface positioned along an axial end of the housing between the outer wall and the channel wall and having a central opening coterminous with the primary gas outlet;

a drain formed in the outer wall of the housing to facilitate removal of liquid contaminant from the assembly;

a baffle extending axially in the housing between the outer wall and the channel wall;

a first air flow passageway defined exteriorly by the outer wall and interiorly by the baffle;

a second air flow passageway defined exteriorly by the baffle and interiorly by the channel wall, the baffle having an opening to accommodate the passage of the air-contaminate mixture from the secondary inlet port and into the second flow passageway;

a filter element removably disposed within at least the second air flow passageway;

a lid removably disposed over a housing axial end having a central opening coterminous with the primary gas inlet and having a surface that extends radially between the outer wall and the channel wall, the lid being disposed over the filter element;

an air filter removably disposed over the lid; and an air filter cover disposed over the air filter and removably connected to the housing, wherein the air filter is interposed between the cover and the lid.

27. An assembly for filtering air flow and separating air-oil contaminate mixtures, the assembly comprising:

a housing having an outer wall and channel disposed therein between a primary gas inlet and a primary gas outlet;

an air filter joined to the primary gas inlet;

a secondary inlet port through the outer wall;

a secondary outlet port through the channel wall;

an air flow passageway between the outer wall and channel and interposed between the secondary inlet and secondary outlet ports;

a removable filter element disposed within the air flow passageway; and means for removably attaching the removable filter within the housing and for providing a substantially air-tight seal with the housing, wherein the means for removably attaching comprises:

a housing lid having a central opening that is positioned over the removable filter element and the primary gas inlet, the lid extending radially from the central opening to a terminal edge that is positioned adjacent the housing outer wall;

an air filter retainer disposed over the lid and connected to the housing primary gas inlet; and a cover disposed over the air filter and removably connected to the filter retainer, wherein the air filter is interposed between the lid and the cover.

28. The assembly as recited in claim 27 wherein the housing includes an inlet flange proximate the primary gas inlet, and wherein the filter retainer is releasibly attached to the inlet flange.

29. An assembly for filtering air flow and separating air-oil contaminate mixtures, the assembly comprising:

a housing having an outer wall and channel disposed therein between a primary gas inlet and a primary gas outlet;

an air filter joined to the primary gas inlet;

a secondary inlet port through the outer wall;

a secondary outlet port through the channel wall;

an air flow passageway between the outer wall and channel and interposed between the secondary inlet and secondary outlet ports;

a removable filter element disposed within the air flow passageway;

means for removably attaching the removable filter within the housing and for providing a substantially air-tight seal with the housing; and a baffle interposed axially between the outer wall and the channel, wherein the baffle defines a second air flow passageway, and wherein the assembly comprises two removable filter elements each disposed within a respective air flow passageway.

30. The assembly as recited in claim 29 wherein the air flow passageways are arranged within the housing such that there is no straight air flow path between the secondary inlet and secondary outlet ports.

* * * * *